United States Patent [19]
Halff et al.

[11] Patent Number: 5,688,399
[45] Date of Patent: Nov. 18, 1997

[54] MEANS FOR SEPARATION AND REMOVAL OF IMPURITIES FROM LIQUIDS

[76] Inventors: Albert H. Halff, 3514 Rock Creek Dr., Dallas, Tex. 75225; Allen F. Reid, 4736 Reservoir Rd., Geneseo, N.Y. 11454

[21] Appl. No.: 600,675

[22] Filed: Feb. 13, 1996

Related U.S. Application Data

[60] Continuation of Ser. No. 205,165, Mar. 3, 1994, which is a division of Ser. No. 996,581, Dec. 24, 1992, Pat. No. 5,372,725, which is a continuation-in-part of Ser. No. 787,326, Nov. 1, 1991, Pat. No. Des. 339,168.

[51] Int. Cl.$^6$ ........................................... C02F 11/08
[52] U.S. Cl. ........................... 210/178; 210/205; 210/210
[58] Field of Search ........................... 210/758, 761, 210/762, 774, 177, 178, 179, 181, 195.1, 205, 210, 218

[56] References Cited

U.S. PATENT DOCUMENTS

| | | | |
|---|---|---|---|
| 3,920,548 | 11/1975 | Fassell et al. | 210/761 |
| 4,108,763 | 8/1978 | Clough | 210/758 |
| 4,673,510 | 6/1987 | Janusch et al. | 210/774 |
| 5,147,563 | 9/1992 | Long, Jr. et al. | 210/758 |

*Primary Examiner*—Thomas G. Wyse
*Attorney, Agent, or Firm*—Joseph J. Previto

[57] ABSTRACT

A mechanism for converting impurities or contaminants in a fluid to a non-hazardous or less hazardous condition by raising the fluid to a supercritical state. This is accomplished by a rotatable mechanism having a reaction chamber adapted to receive the fluid and by rotating the rotatable mechanism at a high speed to cause the temperature and pressure of the fluid in the reaction chamber to reach the supercritical state.

29 Claims, 5 Drawing Sheets

FIG.1 STANDARD SCWO APPARATUS PRIOR ART
PRESSURE VESSEL REACTOR SUPERCRITICAL WATER OXIDATION HAZARDOUS WASTE DISTRUCTION

MEANS FOR SEPARATION AND REMOVAL OF IMPURITIES FROM LIQUIDS

RELATED APPLICATION

This application is a continuation of U.S. application Ser. No. 08/205,165 filed Mar. 3, 1994 which was a division of Ser. No. 07/996,581 filed Dec. 24, 1992, now U.S. Pat. No. 5,372,785, which is a continuation-in-part of application Ser. No. 07/787,326 filed Nov. 1, 1991, now D 339,168, which is incorporated herein by reference together with the Disclosure Statement filed therein.

BACKGROUND

The present invention relates to the separation and the chemical treatment of impurities in a fluid and more particularly relates to the separation and chemical treatment of such impurities in an aqueous environment in order to convert the impurities to a less hazardous or non-hazardous condition.

As more fully disclosed in applicants' above-identified co-pending application, a centrifuge (or some other mechanism for achieving high rotational speeds) provides a system that will permit production of high pressure and high temperatures in a fluid in continuous flow from a low temperature/low pressure liquid. For simplicity, the invention will be disclosed in this application with respect to a liquid aqueous suspension and/or solution. However, it will be understood that the present invention is also applicable to other fluids.

An aqueous liquid achieves a supercritical temperature-pressure state which gives it enhanced ability to promote certain chemical and/or physical changes in the liquid. The critical temperature of water is 705.47° F. (374.15° C.) and its critical pressure is 3208.2 psi. The temperature is called "critical" because above the critical temperature of a substance no amount of pressure will produce its liquid phase. Some solutes in water may increase or decrease that critical temperature.

As described in applicants' said co-pending application, a rotating device, such as a centrifuge or pump, utilizes centrifugal force to provide pressure or vacuum to create and maintain an environment which will initiate and sustain a supercritical condition for a material which occupies the environment. A fluid is in a supercritical condition when the temperature and pressure of a liquid and gas in equilibrium are at, or exceed, a critical temperature (Tc) and a critical pressure (Pc) such that the densities of the liquid and gas become identical. The distinction between the two phases disappears and the resulting substance is described simply as a "supercritical fluid".

At or above supercritical conditions, a mixture of hazardous waste, water, and oxidants can often be chemically altered to produce a mixture which is less hazardous or non-hazardous than the original mixture. As will be described hereinafter in greater detail, a centrifuge device is used as a reactor in a supercritical water oxidation (SCWO) process for the destruction of toxic waste. The centrifuge described herein is used primarily to create a high-pressure environment rather than to separate mixture constituents by density as in conventional centrifuges. The configuration of the centrifuge of the present invention is different from that of conventional centrifuges and employs a novel construction for material containment.

The density of a material in a conventional centrifuge contributes to the creation of pressure and if all other parameters are the same, a denser material will cause a higher pressure at a particular reference point in the centrifuge than a less-dense material will cause at the same reference point. It is a known phenomenon that as the temperature of pressurized water increases, the density of the water decreases. Hence, if a desired pressure is required at a particular reference point, a centrifuge with hot water will have to operate at a greater angular velocity than a similar centrifuge with cold water. In other words, a centrifuge with hot water will have to operate at a greater angular velocity and/or have a greater diameter to produce the same pressure as a similar centrifuge with cold water. Since the SCWO process requires a high temperature, the conventional centrifuges in existence today are unable to easily produce the high pressure for SCWO because of the decrease in density due to the increasing temperature.

When used for the destruction of hazardous waste by a SCWO process, the centrifuges of the present invention will permit the SCWO process to operate more efficiently than existing SCWO processes. The pressure generating ability of the centrifuges of the present invention is not appreciably reduced by a decreasing density due to increasing temperature. The centrifuges of the present invention as disclosed herein will focus on the destruction of hazardous waste by a supercritical water oxidation (SCWO) process although the centrifuges may also be used to other aspects of supercritical fluid technology (SFT).

OBJECTS

The present invention prevents the drawbacks discussed above and has for one of its objects the provision of an improved method and means for separation and removal of impurities from fluids in which improved rotational mechanisms are provided to permit fluids to reach supercritical conditions.

Another object of the present invention is the provision of an improved mechanism and method to separate and remove impurities from fluids in which improved centrifuge mechanisms are used for allowing the fluids to reach supercritical conditions.

Another object of the present invention is the provision of improved centrifuge means are provided which are simple to operate.

Another object of the present invention is the provision of an improved centrifuge means which require low maintenance.

Another object of the present invention is the provision of an improved centrifuge means which will produce and maintain continuous supercritical conditions in fluids at the maximum efficiency.

Other and further objects of the invention will be obvious upon an understanding of the illustrative embodiment about to be described, or will be indicated in the appended claims and various advantages not referred to herein will occur to one skilled in the art upon employment of the invention in practice.

DRAWINGS

A preferred embodiment of the invention has been chosen for purposes of illustration and description and is shown in the accompanying drawings forming a part of the specification, wherein.

DESCRIPTION OF PRIOR ART

Figure 1:
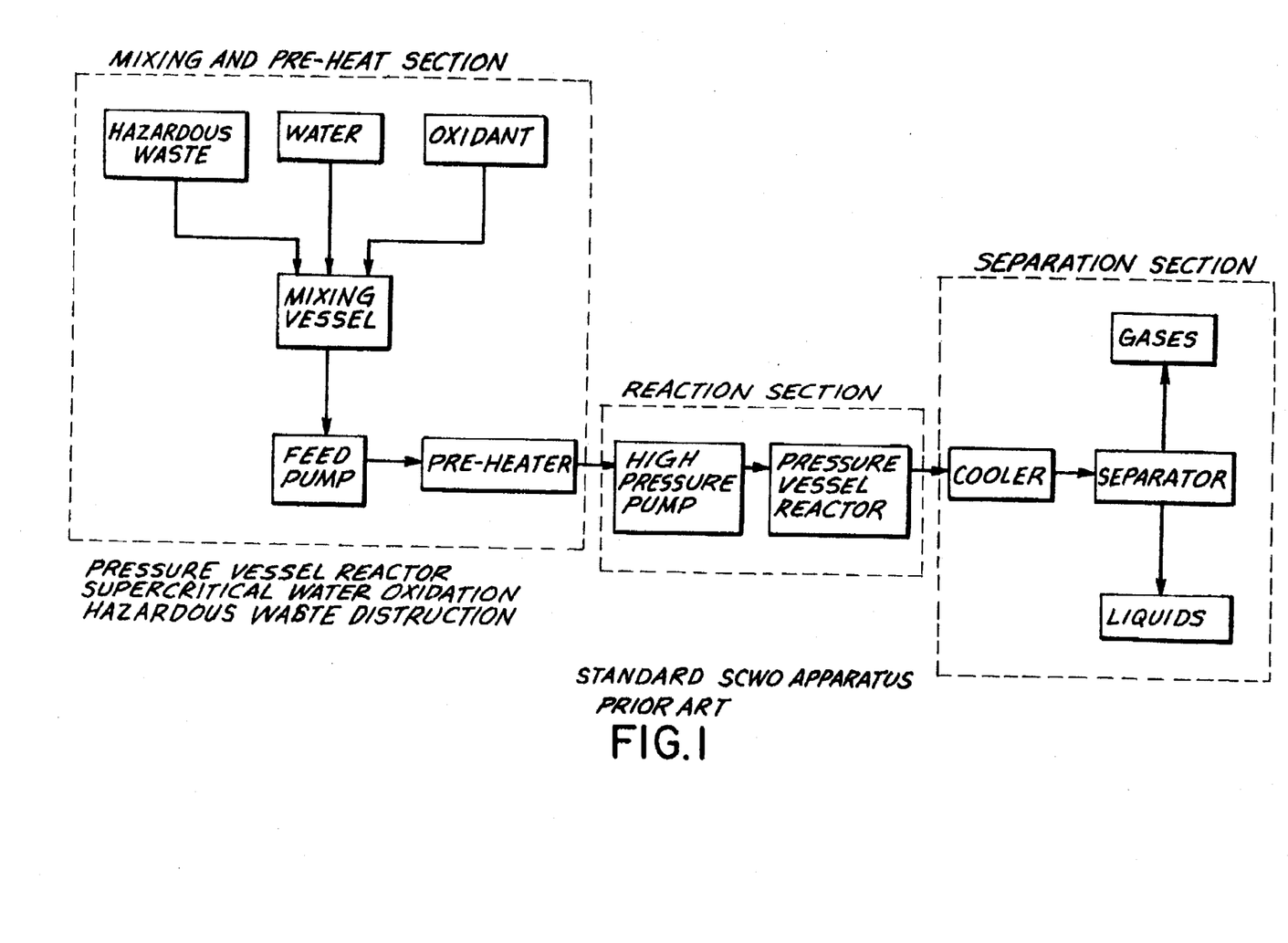
FIG. 1 is a diagrammatic view showing an existing prior art supercritical water oxidation system.

An example of a standard SCWO apparatus in use today for the destruction of hazardous waste is shown in FIG. 1. The SCWO apparatus of FIG. 1 generally consists of a Mixing and Pre-Heat Section, a Reaction Section, and a Separation Section. Among specific existing SCWO apparatus designs, there are numerous differences in the details of the operation, configuration and components of each of the three sections shown in the drawings but the general process is usually quite similar to the one shown in FIG. 1 and described hereinafter.

In the Mixing and Pre-Heat Section, the hazardous waste, water and oxidant are fed to and combined in a Mixing Vessel in predetermined quantities so as to obtain the desired chemical reaction at supercritical conditions. Other chemicals may be added for a variety of purposes, such as to reduce or eliminate corrosion, inhibit or reduce the tendency to form undesirable salts, and/or increase the efficiency of the process, isolate and reduce or eliminate solids, assure complete mixing of the mixture constituents, and eliminate bubbles. A Feed Pump (preferably low pressure) moves the mixture from the Mixing Vessel to a Pre-Heater where the mixture is warmed (but not heated to a supercritical temperature) before entering the Reaction Section.

The Reaction Section of the standard SCWO apparatus usually consists of a High-Pressure Pump and a Heated Pressure Vessel Reactor. The High Pressure Pump compresses the mixture to a pressure near or above the supercritical pressure and the mixture is moved to the heated Pressure Vessel Reactor. Some designs also incorporate a heater unit between the High-Pressure pump and the Pressure Vessel reactor in which event the High-Pressure Pump compresses the mixture to a pressure near or above the supercritical pressure and moves the pressurized mixture into the heater unit where heat is added to the mixture to raise the temperature above the supercritical temperature. In either case, heat may be given off by the mixture to aid in the heating process. After being heated above the supercritical temperature, the mixture is a supercritical fluid which is processed in the Pressure Vessel Reactor before entering the separation section. The reactions that occur in the Pressure Vessel Reactor will convert the impurities to a less hazardous or non-hazardous condition.

In the Separation Section, the fluid is cooled by a Cooler and separated by a Separator into liquid and gaseous components. The main products can be water, carbon dioxide, and simple acids. For many hazardous wastes, the final products are essentially benign and further treatment is not required before disposal.

DESCRIPTION OF INVENTION

Figure 2:
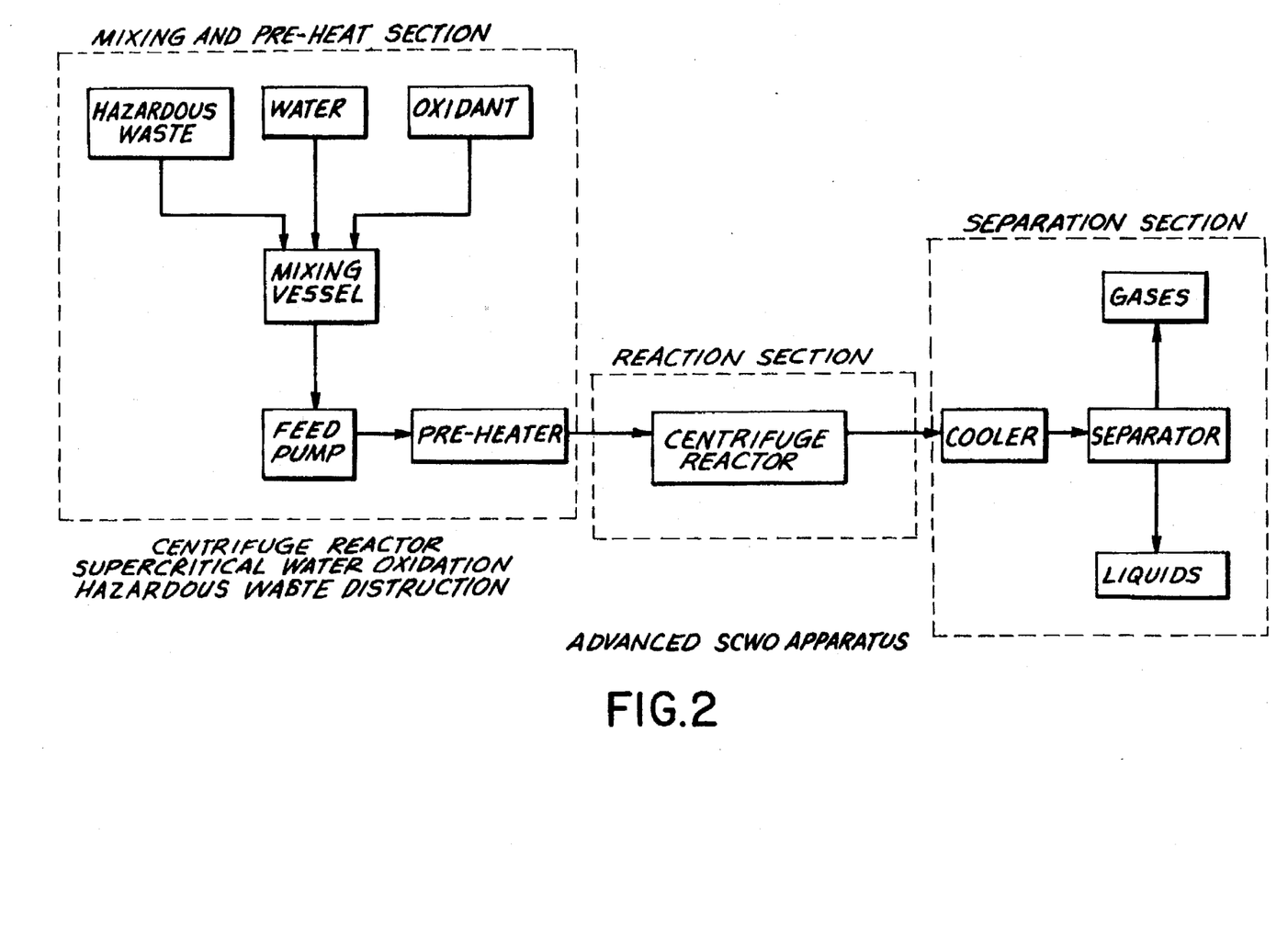
FIG. 2 is a diagrammatic view showing the supercritical water oxidation system to which the present invention is particularly adapted to be used.

In the improvement of the present invention shown in FIG. 2 (which has been described in general in said co-pending patent application) a Centrifuge Reactor is substituted for the High Pressure Pump and Pressure Vessel Reactor in the Reaction Section shown in FIG. 1. The Mixing and Pre-Heat Section and the Separation section have the same general operation, configuration, and components as described in the system shown in FIG. 1. However, in the improvement shown in FIG. 2, a Centrifuge Reactor is used to raise the temperature and pressure of the fluid to the supercritical state. The Centrifuge Reactor will convert the impurities in the fluid to a less hazardous or non-hazardous condition.

Figure 3:
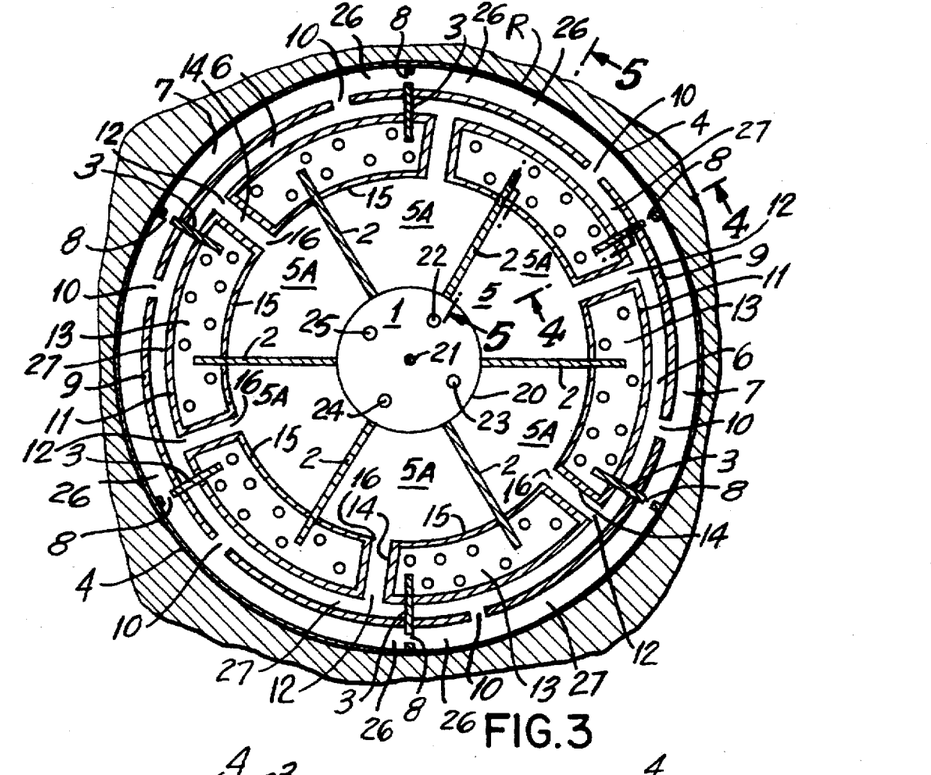
FIG. 3 is a diagrammatic view showing a centrifuge made in accordance with the present invention.
Figure 4:
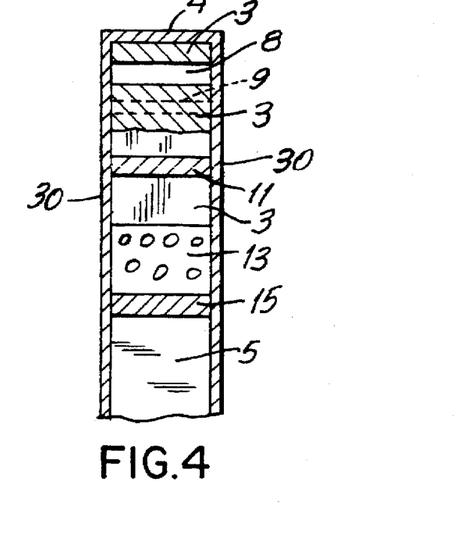
FIG. 4 is a sectional view taken along line 4—4 of FIG. 3.
Figure 5:
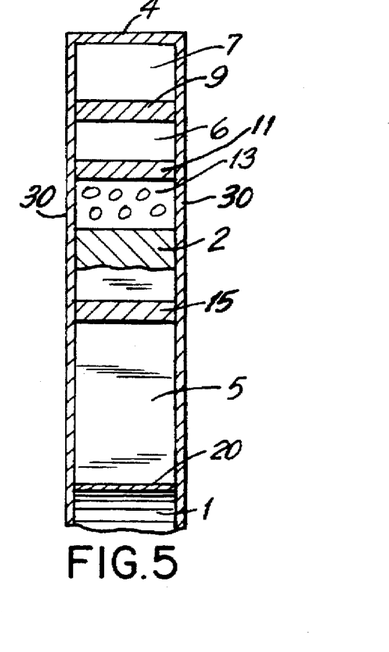
FIG. 5 is a sectional view taken along line 5—5 of FIG. 3.

One type of Centrifuge Reactor which may be used with the present invention is shown in FIGS. 3, 4 and 5. It comprises a fluid containing rotor $\underline{R}$ which may have an outer wall 4 side walls 30 and an inner wall 20 to form a central partially hollow core 1. The central hollow core 1 may contain a central shaft 21 about which the rotor $\underline{R}$ rotates as well as a plurality of pipes 22–23, respectively, for carrying the fluid out of and into rotor $\underline{R}$, pipe 24 for carrying other materials (e.g., air or oxygen to support combustion of wastes), and conduit 25 for electrical, pneumatic, hydraulic, electronic, etc., transmission for metering, actuation and control purposes. Thermal insulation (not shown) may also be located in this central core 1 to reduce heat loss from hot pipes, e.g. 22, to cool pipes and conduits, e.g., 23–25, as well as ballast (not shown) and packing (not shown) to maintain dynamic balance during high rotational spinning.

The rotor $\underline{R}$ has an inner space 5 outwardly of the inner wall 20 into which a cool aqueous charge enters through channels (not shown) from the piping 23 in central core 1. A plurality of inner separator blades 2 extend radially outwardly from the inner wall 20 of core center 1 for the purpose of dividing the inner space 5 into separate compartments 5A. The inner separator blades 2 rotate the fluid simultaneously with the rotation of the rotor $\underline{R}$ to thereby avoid any inertially caused slippage of fluids which would result in reduction of centrifugal pressure, heating of the fluid charge, and increase in the power required to operate the system. The inner separator blades 2 preferably extend across the entire thicknesses of the rotor $\underline{R}$ and stop short of the outer wall 4.

A plurality of outer separating blades 3 extend radially inward from the outer wall 4 of the rotor $\underline{R}$ to approximately the terminal radius of inner blades 2. These outer blades 3 also preferably extend across the thickness of the rotor $\underline{R}$. The outer blades 3 are not colinear with the inner blades 2 but are offset therefrom in order to reduce thermal conduction from the hot outer regions of the rotor $\underline{R}$ to its cool inner regions.

A buffer zone 6 is provided between inner and outer sieve cylinders, 11 and 9 respectively, as a transitional hot region supplied with the aqueous charge flowing in from inner space 5 through openings 14 in an insulation cylinder 13. Buffer zone 6 is formed between the inner sieve cylinder 11 and the outer sieve cylinder 9. Both cylinders preferably extend across the entire width of the rotor $\underline{R}$. The inner sieve cylinder 11 is pierced by openings 12 to permit fluid to enter the buffer zone 6 from the inner zone 5. Further separating the buffer zone 6 from the inner zone 5 is an insulation cylinder 13 which is mounted adjacent the inner sieve cylinder 11. The insulation cylinder 13 has openings 14 therein which may be lined to prevent erosion.

Adjacent the inner surface of the insulation cylinder 13 there is an alloy cylinder 15. Both the alloy cylinder 15 and the insulation cylinder 13 extend across the entire width of the rotor $\underline{R}$. The alloy cylinder 15 is pierced by openings 16 which are colinear with openings 14 and 12 thereby permitting the fluid to pass each inner zone 5 into buffer zone 6 through the openings 12–14–16. It will be noted that the inner blades 2 extend from the inner wall 20 through the inner zone 5 through the alloy cylinder 15 and are embedded into the insulation cylinder 13. It will further be noted that the inner blades 2 stop short of the inner sieve cylinder 11 so that there is no conduction of heat from the inner sieve cylinder 11 to the inner blades 2.

An "SC zone" 7—supercritical or reaction chamber zone—is also provided adjacent the outer wall 4. The outer sieve cylinder 9 is spaced inwardly from the rotor wall 4 to form the supercritical/reaction chamber zone 7. The supercritical/reaction chamber zone 7 receives liquid from the buffer zone 6 through openings 10 therein. Preferably, the outer supercritical zone 9 also extends across the entire width of the rotor R. The outer blades 3 separate the supercritical zone into separate compartments 26. However, the separate compartments 26 are in communication with each other by means of openings 8 therein so that the fluid can move from one compartment 26 to another as the rotor spins. The outer blades 3 extend inwardly from the outer wall 20 of the rotor R through the supercritical/reaction chamber zone 7 through the outer sieve cylinder 9, the buffer zone 6, the inner sieve cylinder 11 and terminates within the insulation cylinder 13. It will be noted that the outer blades 3 terminate short of the alloy cylinder 15 so that there is no heat conduction from the supercritical/reaction chamber zone 7 to the inner zone 5. Moreover, although the inner blades 2 and the outer blades 3 are both embedded in the insulation cylinder, they are angularly offset from each other so that there is no heat conduction between the two blades.

The outer blades 3 separate the buffer zone 6 into compartments 27. It will be noted that an inner zone compartment 5A communicates with a particular buffer zone compartment 27 through openings 12–14–16. The SC/reaction chamber zone 7 is supplied with the aqueous flow from the buffer zone 6 through openings 10 in the outer sieve cylinder 9 and is exhausted through channels (not shown) into effluent pipe 22 in core 1. Oxygen and/or other ingredients for the reactions in the supercritical/reaction chamber zone 7 are directed from piping 24 by channels (not shown) into the zone 7. The outer blades 3 divide the SC/reaction chamber zone 7 into separate compartments 26 and also divide the buffer zone 6 into its separate compartments 27. Openings 8 in the outer blades 3 provide physical transfer from one SC/reaction chamber zone 7 compartment 27 to another compartment 27 thereby affording more uniform distribution of the fluid in SC/reaction chamber zone 7.

The outer sieve cylinder 9 is pierced by a plurality of perforations 10 to enable adequate fluid flow from buffer zone 6 to SC/reaction chamber zone 7 while severely limiting backflow. Because of the perforations 10 the centrifugal pressure on sieve cylinder 9 does not build to the extent that it does against the rotor wall 4 the thickness of the sieve cylinder 9 does not have to be as great as the thickness of the rotor wall 4.

The inner sieve cylinder 11 is provided with perforations 12, (which may have rounded downstream edges) to permit adequate fluid flow from space 5 to buffer zone 6 while severely limiting backflow. Holes 14 are also provided through the insulation cylinder 13 which are colinear with the holes 12 the inner sieve cylinder 9 and are used to permit fluid flow from space 5 to buffer zone 6. They may be lined with appropriate glass or ceramic (not shown) in order to reduce erosion of the insulation cylinder 13 and to reduce heat conduction. The alloy cylinder 15 has perforations 16 colinear with holes 14 in the insulation cylinder 13 and perforations 12 in the sieve cylinder 11 to permit passage of fluid from inner zone 5 to buffer zone 6 and SC/reaction chamber zone 7.

In the embodiment of FIGS. 3–5 the centrifuge R produces a supercritical fluid by first introducing a liquid at ordinary temperature and pressure into the rotating rotor 4 by means of a pipe 25. The fluid is fed from the pipe 25 by suitable conduits (not shown) to the compartments 5A in cool inner zone 5 of the rotor 4. The aqueous fluid has contaminants and waste products in solution and/or or suspension. As the rotor 4 continues to spin rapidly, there is no inertial slippage because the fluid is in the various compartments 5A formed in inner zone 5 by the inner blades 2. The fluid moves from the inner zone 5 to the buffer zone 6 through the openings 12, 14, 16. In the buffer zone 6 the fluid is heated to around 700° F. As the rotor 4 continues to rotate at high speeds, the fluid will pass from the buffer zone 6 to the SC/reaction chamber zone 7 through openings 10 in outer sieve cylinder 9. Again, there is no inertial slippage because the fluid is in the various compartments 27 formed in the buffer zone 6 by the outer blades 3.

In the SC/reaction chamber zone 7, the necessary reactions take place when the supercritical temperature and pressure are reached. With the SC/reaction chamber zone 7 at the supercritical temperature and pressure, the impurities in the fluid will be transformed into a non-hazardous or less hazardous state. The fluid with the transformed impurities may then be directed back out of the SC/reaction chamber zone 7 and the rotor 4 by suitable conduits (not shown) and pipe 23 after which they are transferred to the separation section of the system described in connection with FIG. 2.

It will be noted that the outer blades 3 separate the SC/reaction chamber zone 7 into separate compartments 26 and that the outer blades 3 also separate the buffer zone 6 into separate compartments 27. Hence, the fluids in zones 4, 5, 6 and 7 will be moved along by the rotation of the rotor with a minimum of drag. The fluid will move from each compartment 5A in zone 5 to its corresponding compartment 26 in zone 6 through openings and thereafter into corresponding sectors in zone 7 through openings 10. The fluid in the critical state in the various compartments 26 of zone 7 is allowed to move from one compartment 26 to another compartment 26 by means of the openings 8 in the outer blades 3. This will permit the even distribution of the fluid in the critical state as well as equalize the temperature and pressure in the SC/reaction chamber zone 7 so that uniformity is maintained. It will be noted that the inner blades 2 are angularly spaced from the outer blades 3 so that there is no heat loss through conduction in the blades. In this connection, it will further be noted that both the inner blades 2 and the outer blades 3 terminate within the insulation sleeve 13 so as to substantially eliminate any heat conduction from blades 3 to blades 2.

The rotor R, spinning at high speed and filled with an aqueous liquid, will, by means of centrifugal force develop a very high pressure against the aqueous liquid in SC/reaction chamber zone 7 near the outer cylindrical wall 4 of the rotor R, a pressure which can be above the critical pressure. If the aqueous liquid in SC/reaction chamber zone 7 is then heated above the critical temperature, say to 730° F. (water critical temperature is 705.47°) by any means, the supercritical state is achieved and maintained. In that supercritical state the liquid becomes an environment which promotes many chemical changes which will change the condition of any hazardous wastes and contaminants in the liquid to a less hazardous or non-hazardous one.

Adequate continuous heating of the supercritical/reaction chamber zone 7 is readily accomplished through oxidation of fuels within the supercritical/reaction chamber zone 7. But for start-up from a cool aqueous charge throughout the rotor R, other heating methods may also be used. One option is friction heating and another option is induction heating. Both friction and induction heating would heat the cylindrical wall 4 of the rotor R and heat would be conducted through the wall 4 into the aqueous fluid in the SC/reaction chamber zone 7 until supercritical conditions are reached which permit the easy fuel oxidation. Heating the wall could be discontinued when supercritical temperatures are reached.

When a production run is proceeding, heat conduction from the supercritical/reaction chamber zone 7 into the more centrally located liquid in zone 5 is controlled in order to prevent the centrifugal pressure from being reduced to useless levels. The centrifuge rotor R of the present invention will avoid this from occurring because there is no heat production in any fluid regions other than the supercritical/reaction chamber zone 7. The buffer zone 6 is maintained at a relatively high temperature of about 700° F. at its sieve cylinder boundary 11. The small temperature gradient of 30° F. between the 700±F. in buffer zone 6 and the 730° F. in supercritical/reaction chamber zone 7 limits its heat conduction through buffer zone 6. Insulation cylinder 13 permits only limited heat conduction from buffer zone 6 into inner zone 5 thereby maintaining the 700° F. temperature at buffer zone 6 and keeping inner zone 5 relatively cool. It will be noted that there are no highly heat-conductive structures directly connecting the fluids in the hot zones 6 and 7 to the fluids in the cool zone 5. Any highly heat-conductive structures which might connect the fluids in these zones, such as the rotor walls 30 and pipes 22–25 for transferring fluids and services from the outer hot SC/reaction chamber zone 7 to the central cool zone 5 are appropriately insulated to prevent such direct thermal connection.

The flow-through rate of the liquid is high enough so that flow from inner zone 5 of its heated downstream (radially outermost) layer nearest to buffer zone 6, is replaced by cooler upstream layers, nearer to rotor center, in inner zone 5 and rapid enough to keep the downstream inner zone 5 layer adequately cool. The net effect of this is to continually transport the heat conducted through the insulation from buffer zone 6 to inner zone 5 back to zone buffer 6 via liquid flow through back and forth sequences in openings 16, 14, 12. Flow-through rate of the aqueous fluid is balanced with the perforation sizes and numbers in sieve cylinders 9 and 11 so that flow is primarily from zone 5 to zone 6 and zone 6 to zone 7 with minimal back flow and flow from zone 5 into zone 6 results in minimal turbulence.

The preferred thickness of the rotor R is abut 2 inches and its inside diameter is preferably about 16.00 (6.3"). The various metal parts of the rotor R of the present-invention are preferably metal alloys appropriate to their uses. The alloys must have good resistance to corrosion especially those in contact with supercritical fluid in zone 7 and the very hot water in zone 6. Most will have densities near 8 cm$^3$; tensile strength>75,000 psi at 750° F. and below; thermal conductivity from 100 to 800° F. around k=8 to 10 Btu/hr×ft$^2$=(F/ft). Appropriate alloys for construction of the invention are HASTELLOY C-272 or C-22 made by Haynes International or INCONEL.

The insulation cylinder 13 may be molded silicone with a mineral filter and a density of 1.8 to 2.0 g/cm$^3$. It would have a thermal conductivity of k=0.09 to 0.10 and a maximum recommended service temperature of >700° F. The tensile strength is 4000 to 4300 psi. The thickness of the cylinder 13 is shown in the drawing is based on k=0.093. Linings for the holes 14 in the insulation cylinder 13 may be of any appropriate material with low thermal conductivity such as is flint glass with k=0.48, which is higher than water (k=0.26 at 700° F. and 0.36 at 100° F.).

Setting a resident period of 50 seconds for an aqueous fluid in the SC/reaction chamber zone 7, the output during continuous operation is 715.9 g/50 sec or 113.6 pounds/hr= 2727 pounds per 24 hours. The rotation rate of rotor R is preferably about 35,000 rpm. The fluid introduced into zone 5 from the source pipe 23 in center case 1 may have been warmed somewhat in passage and is listed as 70° F. at its upstream start in inner zone 5. Several physical properties of the fluid as it progresses through the rotor are listed in the following table:

| From Axis | Material | | Fluid | | |
|---|---|---|---|---|---|
| r (cm) | Upstream | Downstream | °F. | D (g/cm$^3$) | psi |
| 2.10 | 5 | 5 | 70 | 0.9981 | 50 |
| 4.44 | 5 | 5 | 73 | 0.9977 | 1540 |
| 4.82 | 5 | 5 | 79 | 0.9969 | 1880 |
| 5.20 | 5 | 13 | 104 | 0.9923 | 2250 |
| 6.50 | 13 | 11 | 700 | 0.437 | 3320 |
| 7.15 | 6 | 9 | 730 | 0.347 | 3620 |
| 8.00 | 7 | 4 | 730 | 0.35 | 4050 |

Figure 6:
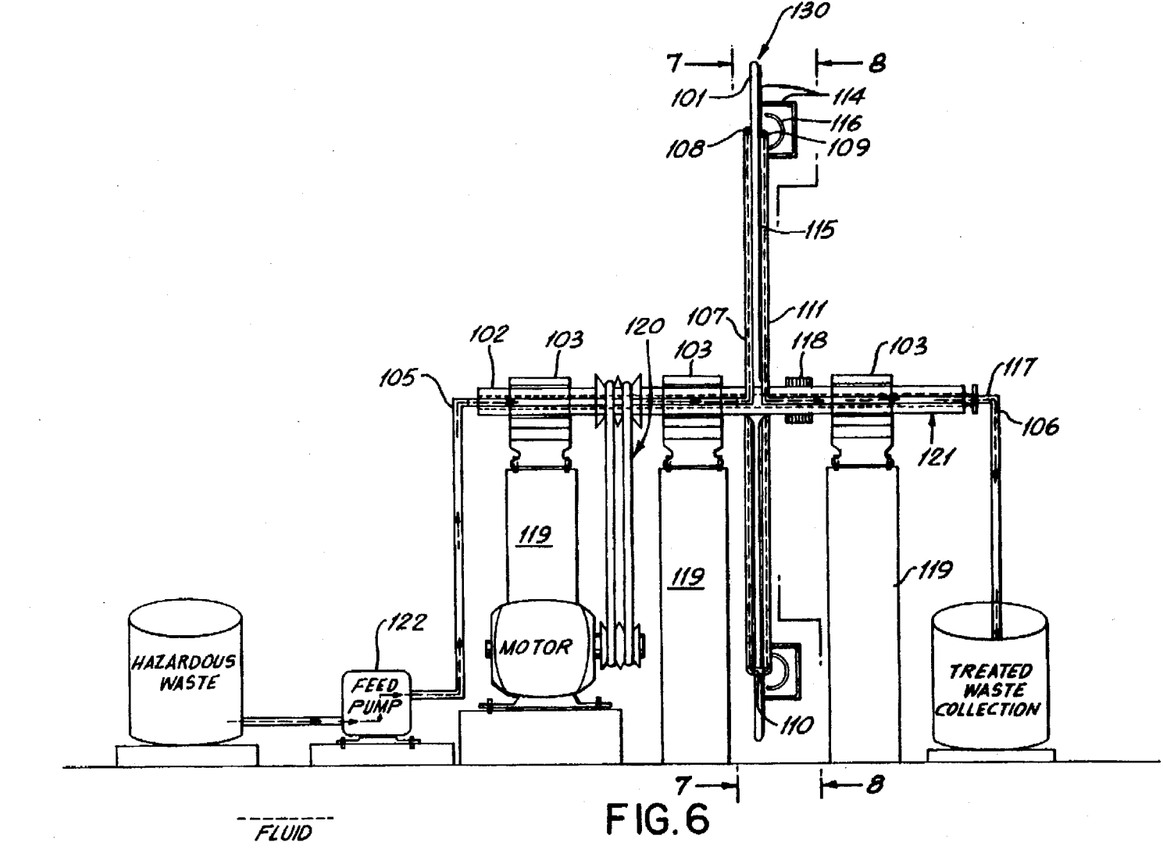
FIG. 6 is a diagrammatic view showing another embodiment of the present invention.
Figure 7:
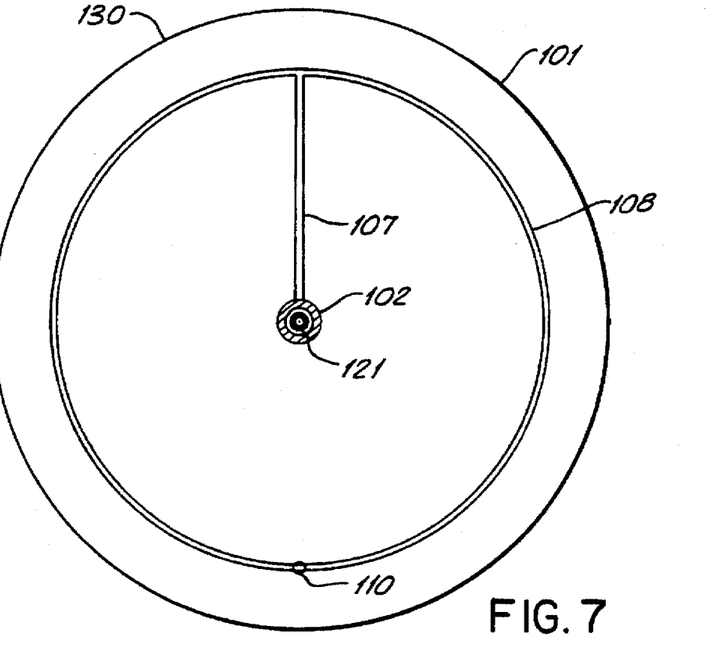
FIG. 7 is a sectional view taken along line 7—7 of FIG. 6.
Figure 8:
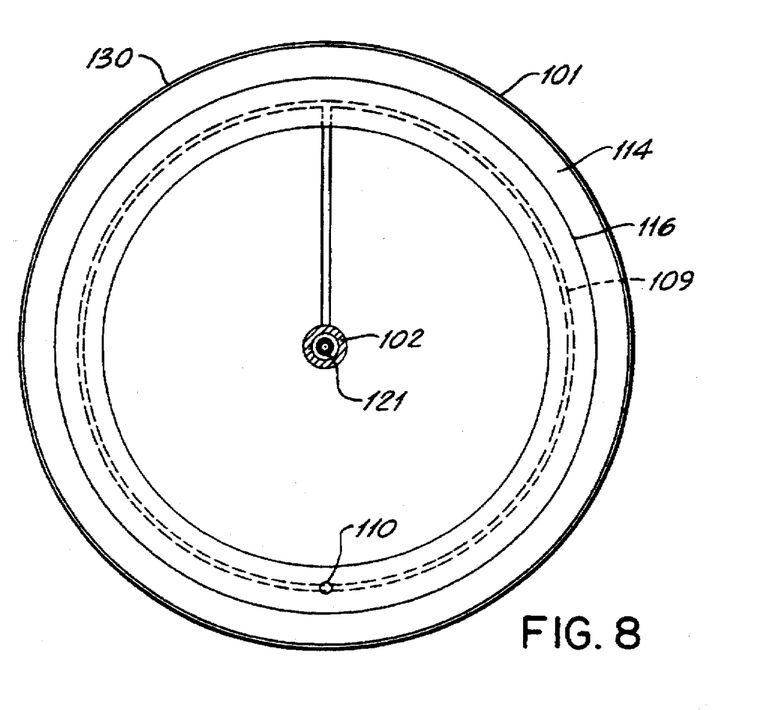
FIG. 8 is a sectional view taken along line 8—8 of FIG. 6.

Another embodiment of the centrifuge of the present invention is shown in FIGS. 6–8. A thin support structure or rotating disk 101 is affixed to a shaft 102. The shaft 102 is supported in bearings 103 and is free to rotate when driven by a propulsion source 104, such as an electric motor or other similar device. The bearings 103 are mounted on suitable bearing supports 119. The propulsion source 104 may be directly connected to the shaft 2 or may transmit power to the shaft 2 by means of gears, pulleys and belts, or some other power transmitting means collectively referred to as belt drive assembly 120 as shown in FIG. 6. The shaft 102 is preferably hollow so that there is a passage 121 through the shaft 102. Slip rings 11 may be affixed to the shaft 102 at convenient locations in order to provide a means to transfer data from sensors thereon (not shown) to a monitoring or reading station (not shown).

A hollow feed tube 107 with an inlet 105 is connected to the outlet of a feed pump 122 in the mixing and pre-heat section (FIG. 2) by means of any suitable device, such as a rotating union (not shown). The feed tube 107 extends from the inlet 102, preferably through the passage 121 in the shaft 2 as shown in FIG. 4. However, it is within the purview of this invention for the inlet 105 to be outside the shaft 2.

At the juncture of the disk 101 and the shaft 102, the feed tube 107 bends away from the shaft 102 and is directed towards the outer periphery 130 of the disk 101. The path of the feed tube 107 from its juncture with the shaft 102 and its direction to the outer periphery 130 of the disk 101 is preferably a straight line as shown in the drawings. However, it is within the purview of the present invention that the feed tube 107 to be spiral or some other shape.

In the vicinity of the outer periphery 130 of the disk 101, the feed tube 107 connects to a reaction chamber 108 which is shown in the form of a hollow pressure tube 108. The pressure tube 108 is shown in the drawings as being circular. However, it will be understood that it is within the purview of the present invention to make pressure tube 108 straight, curved, spiral, coil or some other suitable shape. The pressure tube tube 108 connects to a hollow heater/reaction chamber tube 109 on the other side of rotating disk 101 by means of a hollow flow tube 110. The flow tube 110 connects the pressure tube 108 to the heater reaction chamber tube 109 through the disk 101, either around the outer periphery 130 of the disk 101 or along some other suitable path. Although heater/reaction chamber tube 109 it is shown in the drawings as being circular and it is within the purview of the present invention to make the heater/reaction chamber tube 109 straight, curved, spiral, coil, or some other suitable shape.

The heater/reaction chamber tube 109 is connected to a hollow drain tube 111 which directs the fluid away from the outer periphery 130 and toward the shaft 102 along the disk 101. The drain tube 111 on the disk 101 is shown as being straight. However, if desired, the drain tube 111 may be circular, curved, coil, spiral, or some other suitable shape. At the juncture of the disk 101 and the shaft 102, the drain tube 111 bends and is directed within passage 121 along the shaft 102 towards the outlet 106, as shown in 6. At the outlet 106, the drain tube 111 is connected to a metering valve 117 which controls the flow of high-temperature/high-pressure fluids from the disk 101. The metering valve 117, which may be any well known type of valve, e.g., mechanical, electrical, magnetic, etc., is connected to the separation section of FIG. 2 by means of any suitable device such as a rotating union.

The disk 101 of the present invention is partitioned into a cool side 112 and a hot side 113 by means of insulation layer 114 on the disk 101 which forms a thermal barrier 115 between the cool side 112 and the hot side 113. The pressure tube 108 on the cool side 112 may be painted with some sort of coating to keep the material in the pressure tube 108 at the proper operating temperature. Alternatively, a heating device (not shown) may be provided to keep the pressure tube 108 at the proper temperature if the cool side 112 is too cold for proper operation.

A heater 116 or some other means for raising the temperature of the contents of the heater/reaction chamber tube 109 on the hot side 113 is provided in the proximity of the heater tube 109. In some instances, the heater 116 may not be necessary and in other instances a cooling unit (not shown) may be provided to cool the heater reaction chamber tube 109 to a suitable temperature. The heater 116 may be affixed to the disk 101 and rotate with the shaft 102 or the heater 116 may not be affixed to the disk 101 and not rotate.

To reduce or eliminate the undesirable effects of corrosion, the materials used for the feed tube 7, pressure tube 8, flow tube 10, heater tube 9, drain tube 11, and other components of the system may be a suitable alloy such as Hastelloy C-22, Hastelloy C-276, or Inconel 625. Other materials found suitable to resist or eliminate corrosion such as ceramics and glass may be used as apparatus components or used as liners and coatings to resist or eliminate corrosion of apparatus components.

In this embodiment, the fluid mixture moves from the stationary mixing and pre-heat section to the rotating reaction section in FIG. 2 through a rotating union or other suitable coupling (not shown). The reaction section contains the "centrifuge reactor" shown and described in connection with FIGS. 6–8. The mixture enters the centrifuge inlet 105 and flows along the feed tube 107 toward the outer periphery 130 of the disk 101. As the mixture passes through the portion of the feed tube 107, the rotary motion of the disk 101 accelerates the mixture. In general, the mixture is accelerated because of the change of the position of the path from the shaft tube 105 to the feed tube 107 through which the mixture flows. At any specified position, the change of the position of the path through the feed tube 107 may be due to (a) the radial displacement of the position from the axis of rotation of the shaft 102, (b) the time rate of change of the radial displacement of the position from the axis of rotation of the shaft 102, a quantity called radial speed, (c) the time rate of change of the radial speed, a quantity called radial acceleration, (d) the angular speed of the feed tube 107, (e) the time rate of change of the angular speed of the feed tube 107 (angular acceleration) and/or (f) various combinations of parameters (a) through (e). Other factors such as gravity, wobble of the disk 101, and action of the shaft 102 in the bearings 103 may contribute additional components to the acceleration of the mixture. The effect the mixture acceleration, mixture density, and centrifuge configuration is the creation of pressure within the mixture contained in the feed tube 107.

The pressurized mixture moves from the feed tube 107 through the connection to the pressure tube 108. The pressure tube 108 serves as a plenum and temperature sink to stabilize the mixture. The pressurized mixture moves from the pressure tube 108 to the heater/reaction chamber tube 109 through the flow tube 110. In the heater/reaction chamber tube 109, the temperature of the pressurized mixture is increased by the heater 116 until the mixture reaches its supercritical state and becomes a supercritical fluid. Heat generated by the exothermal action of the mixture aids in the overall heating process. As a supercritical fluid, the mixture undergoes the process of supercritical water oxidation (SCWO). The length of the heater/reaction chamber tube 109 is long enough so that the residence time of the mixture in the supercritical state is sufficient to complete the desired chemical reaction at the flow rate of the mixture, i.e., converting hazardous wastes and contaminants to a less hazardous or non-hazardous state.

The supercritical fluid flows from the heater reaction chamber tube 109 through the drain tube 111 and toward the shaft 102 along a path on the support disk 101. The mixture continues to flow through the drain tube 111 at the juncture of the disk 101 and the shaft 102 and then along the shaft 102 toward the outlet 106. At the outlet 106, the mixture flows through the drain tube 111 into metering valve 117 which maintains pressure throughout the centrifuge by controlling the flow rate of material through the centrifuge. The metering valve 117 is connected to the separation section by means of any suitable device such as a rotating union (not shown).

While the present invention has been described with respect to a device for achieving supercritical pressure and temperature to separate and remove impurities, it will be understood that the present invention may also be used as a reactor in a process for purposes other than hazardous waste destruction, and could be used for a wide range of processes in Supercritical Fluid Technology (SFT). For example, it is well known that as the temperature of the water in the centrifuge increases, it will boil unless the pressure on it is greater than its vapor pressure. The steam will rapidly flow toward the axis of rotation of the centrifuge, causing a substantial reduction in the centrifugal pressure (one reason for this is when the temperature of the water increases, its density decreases and the buoyancy of the less dense water will exert a force on it toward the axis of rotation opposite to the centrifugal force). This may cause mixing and gradual progression of the hotter water toward the axis where the centrifugal pressure is too low to prevent boiling. This thermal conduction of heat through the water and the centrifuge structure—conduction from the outer hotter zones to the more central colder zones—may not only aggravate the plenum described above but may also (because of water's reduced density at higher temperatures) increase the centrifugal acceleration necessary to produce requisite pressures. Such increase in centrifugal force will substantially increase the stresses on the centrifuge bowl thereby requiring stronger and heavier construction as well as substantial increases in power. It is believed that by using the centrifuges disclosed and described above, these drawbacks will also be eliminated.

It will thus be seen that the present invention provides an improved method and means for separation and removal of impurities from fluids in which improved rotational mechanisms, such as centrifuges, are provided to permit fluids to reach supercritical conditions which are simple to operate and which will produce and maintain continuous supercritical conditions in fluids at the maximum efficiency.

As many and varied modifications of the subject matter of this invention will become apparent to those skilled in the art from the detailed description given hereinabove, it will be understood that the present invention is limited only as provided in the claims appended hereto.

THE EMBODIMENTS OF THE INVENTION IN WHICH AN EXCLUSIVE PROPERTY OR PRIVILEGE IS CLAIMED ARE DEFINED AS FOLLOWS:

1. In a mechanism for converting impurities or contaminants in a fluid to a non-hazardous or less hazardous condition in which the fluid is raised to a supercritical state, the improvement of which comprises:
   (a) a rotatable mechanism;
   (b) said rotatable mechanism having a solution-receiving reaction chamber therewithin adapted to receive the fluid;
   (c) means for introducing said aqueous solution into the solution-receiving chamber of said rotatable mechanism;
   (d) means for rotating the rotatable mechanism together with the solution-receiving chamber therewithin and while said aqueous solution is within said solution-receiving chamber at a high speed whereby the aqueous solution within said solution-receiving chamber is rotated with the rotatable mechanism means;
   (e) means for applying heat to the fluid in the reaction chamber for continuing the rotation thereof and means for continuing the application of heat to the fluid in the reaction chamber until the temperature and pressure of the fluid in the reaction chamber reaches the supercritical state;
   (f) means to maintaining the fluid in said supercritical state until the impurities are separated from the liquid;
   (g) said rotatable mechanism being a circular rotatable mechanism;
   (h) said reaction chamber is a circular reaction chamber within said rotatable mechanism;
   (i) said rotatable mechanism being a closed chamber;
   (j) said reaction chamber being located in the proximity of the outer periphery of the rotatable mechanism
   (k) said rotatable mechanism has a central region spaced axially inwardly of the reaction chamber;
   (l) and means are provided to direction fluid from the central region of the circular rotatable mechanism to said reaction chamber in the outer periphery of the rotatable mechanism.

2. A mechanism as set forth in claim 1 wherein said rotatable mechanism has a fluid-receiving chamber which is cooler than the reaction chamber and which receives the fluid before the reaction chamber.

3. A mechanism as set forth in claim 2 wherein the rotatable mechanism is a rotor having an outer wall and wherein said reaction chamber is adjacent the outer wall.

4. A mechanism as set forth in claim 3 wherein the cooler chamber is a buffer chamber adjacent the reaction chamber and in communication therewith.

5. A mechanism as set forth in claim 4 wherein an outer sieve cylinder separates the buffer chamber from the reaction chamber.

6. A mechanism as set forth in claim 5 wherein the buffer chamber is formed between the outer sieve cylinder and an inner sieve cylinder.

7. A mechanism as set forth in claim 6 wherein the buffer chamber and the reaction chamber are in communication with each other through openings in the outer sieve cylinder.

8. A mechanism as set forth in claim 7 wherein an insulation cylinder is provided adjacent the inner sieve cylinder.

9. A mechanism as set forth in claim 8 wherein an inner wall is provided to form the central region.

10. In a mechanism for converting impurities or contaminants in a fluid to a non-hazardous or less hazardous condition in which the fluid is raised to a supercritical state, the improvement of which comprises a rotatable mechanism said rotatable mechanism having a solution-receiving reaction chamber therewithin adapted to receive the fluid, means for introducing said aqueous solution into the solution-receiving chamber of said rotatable mechanism, means for rotating the rotatable mechanism together with the solution-receiving chamber therewithin and while said aqueous solution is within said solution-receiving chamber at a high speed whereby the aqueous solution within said solution-receiving chamber is rotated with the rotatable mechanism means, means for applying heat to the fluid in the reaction chamber for continuing the rotation thereof and means for continuing the application of heat to the fluid in the reaction chamber until the temperature and pressure of the fluid in the reaction chamber reaches the supercritical state, means to maintaining the fluid in said supercritical state until the impurities are separated from the liquid, said rotatable mechanism being a circular rotatable mechanism, said rotatable mechanism has a central region and wherein means are provided to direct fluid from the central region of the circular rotatable mechanism to said reaction chamber, said rotatable mechanism has a fluid-receiving chamber which is cooler than the reaction chamber and which receives the fluid before the reaction chamber, said rotatable mechanism is a rotor having an outer wall and wherein said reaction chamber is adjacent the outer wall, the cooler chamber is a buffer chamber adjacent the reaction chamber and in communication therewith, an outer sieve cylinder separates the buffer chamber from the reaction chamber, the buffer chamber is formed between the outer sieve cylinder and an inner sieve cylinder, the buffer chamber and the reaction chamber being in communication with each other through openings in the outer sieve cylinder, an insulation cylinder is provided adjacent the inner sieve cylinder, an inner wall is provided to form the central region and an alloy cylinder is provided spaced from the inner wall to form an inner region therebetween.

11. A mechanism as set forth in claim 10 wherein the inner region is in communication with the buffer chamber through openings in the alloy cylinder, the insulation cylinder and the inner sieve cylinder.

12. A mechanism as set forth in claim 11 wherein said openings are in coaxial alignment with each other.

13. A mechanism as set forth in claim 12 wherein inner blades extend across the width of the rotor to separate the inner region into separate compartments.

14. A mechanism as set forth in claim 13 wherein the inner blades extend from the inner wall and through the alloy chamber and are embedded in the insulation chamber.

15. A mechanism as set forth in claim 14 wherein the inner blades terminate short of the inner sieve cylinder.

16. A mechanism as set forth in claim 15 wherein outer blades extend inwardly from the outer wall of the rotatable mechanism and through the outer and inner sieve cylinders and are embedded in the insulation cylinder.

17. A mechanism as set forth in claim 16 wherein said outer blades terminate short of the inner alloy cylinder.

18. A mechanism as set forth in claim 17 wherein said outer blades are angularly displaced from the inner blades.

19. A mechanism as set forth in claim 18 wherein said outer blades separate the buffer chamber and the reaction chamber into separate compartments.

20. A mechanism as set forth in claim 19 wherein the separate compartments of the reaction chamber communicate with each other through openings in the outer blades.

21. A mechanism as set forth in claim 20 wherein the rotor has a central core radially inwardly of the inner wall to accommodates conduits for the fluid.

22. A mechanism as set forth in claim 21 wherein the rotatable mechanism is a circular disc and wherein the reaction chamber is in the form of a circular tube mounted on the rotatable mechanism.

23. A mechanism as set forth in claim 22 wherein a buffer chamber is provided which is a circular tube mounted on the rotatable mechanism.

24. A mechanism as set forth in claim 23 wherein the buffer chamber and the reaction chamber are on opposite sides of the rotatable mechanism.

25. A mechanism as set forth in claim 24 wherein a connection is provided between the reaction chamber and the buffer chamber to permit fluid to flow from the buffer chamber to the reaction chamber.

26. A mechanism as set forth in claim 25 wherein a tube extends outwardly from the center of the rotatable mechanism to the buffer chamber to supply fluid to the buffer chamber.

27. A mechanism as set forth in claim 26 wherein a tube extends from the reaction chamber towards the center of the rotatable mechanism to remove fluid from the reaction chamber.

28. A mechanism as set forth in claim 27 wherein insulation is affixed to the side of the rotatable mechanism where the reaction chamber is located.

29. A mechanism as set forth in claim 28 wherein heat is applied to the reaction chamber side of the rotatable mechanism.

* * * * *

UNITED STATES PATENT AND TRADEMARK OFFICE
CERTIFICATE OF CORRECTION

PATENT NO. : 5,688,399
DATED : November 18, 1997
INVENTOR(S) : Albert H. Halff and Allen F. Reid It is certified that error appears in the above-identified patent and that said Letters Patent is hereby corrected as shown below:

On the cover page, [Item 60] cancel "787,326, Nov 1, 1991 Pat. No. Des. 339,168" and substitute: --- 787,362, Nov 4, 1991, abandoned, and continuation thereof under Serial No. 08/439,036, May 11, 1995, Column 1, Line 9, cancel "07/787,326, filed November 1, 1991, now Des. 339,168" and substitute: --- 07/787,362 filed November 4, 1991, now abandoned, and refiled as a continuation thereof under Serial No. 08/439,036, May 11, 1995 still pending ---

Signed and Sealed this

Twenty-sixth Day of May, 1998

*Attest:*

BRUCE LEHMAN

*Attesting Officer*     Commissioner of Patents and Trademarks